United States Patent [19]

Kawakami et al.

[11] Patent Number: 5,206,283
[45] Date of Patent: Apr. 27, 1993

[54] RUBBER COMPOSITION FOR AUTOMOBILE TIRES

[75] Inventors: Kinya Kawakami, Kanagawa; Takao Muraki, Hiratsuka; Shigeru Shinoda, Chigasaki, all of Japan

[73] Assignee: The Yokohama Rubber Co., Ltd., Japan

[21] Appl. No.: 770,141

[22] Filed: Oct. 3, 1991

Related U.S. Application Data

[63] Continuation of Ser. No. 507,771, Apr. 12, 1990, abandoned.

[30] Foreign Application Priority Data

Apr. 14, 1989 [JP] Japan .................................. 1-93012

[51] Int. Cl.$^5$ ................................................ C08K 3/04
[52] U.S. Cl. .................................... 524/496; 524/495; 524/847
[58] Field of Search .................... 524/495, 496, 847

[56] References Cited

U.S. PATENT DOCUMENTS

| | | | |
|---|---|---|---|
| 3,830,774 | 8/1974 | Jordan | 524/496 |
| 4,154,277 | 5/1979 | Sato et al. | 524/496 |
| 4,500,672 | 2/1985 | Suzuki et al. | 524/496 |

FOREIGN PATENT DOCUMENTS

| | | | |
|---|---|---|---|
| 0031547 | 2/1985 | Japan | 524/496 |
| 0072939 | 4/1985 | Japan | 524/496 |
| 1091234 | 5/1986 | Japan | 524/496 |
| 2129327 | 6/1987 | Japan | 524/496 |
| 2143947 | 6/1987 | Japan | 524/496 |

*Primary Examiner*—Paul R. Michl
*Assistant Examiner*—Peter Szekely
*Attorney, Agent, or Firm*—Finnegan, Henderson, Farebow, Garrett & Dunner

[57] ABSTRACT

Rubber compositions for use in tire treads are disclosed. One or more selected styrene-butadiene rubbers of specified glass transition temperatures are blended with a selected type of carbon black of specified physical characteristics. The composition is highly stable in runnability on dry, wet and snowy roads.

4 Claims, No Drawings

RUBBER COMPOSITION FOR AUTOMOBILE TIRES

This application is a continuation of application Ser. No. 07/507,771, filed Apr. 12, 1990, now abandoned.

BACKGROUND OF THE INVENTION

1. Technical Field

This invention relates to rubber compositions for use in automobile tires and more particularly to such a composition having utility as tire treads of an all-weather type.

2. Prior Art

Automotive vehicles have recently been designed with higher degrees of sophistication particularly as is in the case with passenger cars. This literally requires greater driveability, meaning that tire requirements have become more strict with respect to running stability and braking ability characteristics among other important qualities.

It is known that the above qualities can be improved by the application of rubbers of a large loss tangent to tread portions. Loss tangent is referred to usually as tan δ and associated closely with road gripping. The larger loss tangent at the same level of hardness, the more intensely the tire grips the road surface. Great magnitudes of loss tangents are attainable generally with the use of styrene-butadiene rubbers (SBRs) of higher than $-40°$ C. in glass transition temperature (Tg) that are abundant in styrene and vinyl contents. SBRs of such a high Tg depend widely upon temperature and thus vary in hardness over a wide range of temperatures, say from about $-20°$ to $100°$ C., to which the tire usually gets exposed in actual use. In this instance SBRs when set to maximize tan δ at room temperature are encountered with instable runnability not only in cold season but even in warm season due to a sharp rise in temperature during the running of the tire.

Carbon blacks of too small a particle size will in most cases make the resulting rubber mix excessively hard and hence instably runnable. Process oils may be added to reduce or eliminate this problem but to an extent to invite quality deterioration.

Viewed in that situation of the prior art, there has still much to be desired for the provision of tread rubbers of better qualities.

SUMMARY OF THE INVENTION

The present invention seeks to provide a new rubber composition for the formation of tire treads which will exhibit large loss tangent at both low and high temperatures and least temperature dependency on hardness, thus contributing to sufficient road gripping under all-weather conditions.

The above and other objects and features of the invention will become apparent from the following description.

More specifically, the invention provides a rubber composition for use in tire treads. The composition comprises a base rubber comprising one or more styrene-butadiene rubbers having a glass transition temperature of not higher than $-40°$ C. and a carbon black in an amount of 30 to 100 parts by weight per 100 parts by weight of the base rubber. The carbon black has an $N_2SA$ of 110 to 140 $m^2/g$ as determined by nitrogen adsorption, a 24M4 DBP of 85 to 95 ml/100 g as determined by dibutyl phthalate adsorption, a ΔDst of smaller than 55 mμ as determined by aggregate size distribution and a ratio of ΔDst to $N_2SA$ of less than 0.43.

DESCRIPTION OF THE PREFERRED EMBODIMENTS

Rubber compositions according to the present invention incorporate a specific family of base rubbers and a specific type of carbon blacks.

Base rubbers eligible for purposes of the invention are styrene-butadiene rubbers (SBRs) having a glass transition temperature (Tg) of lower than $-40°$ C. SBRs of varied temperatures of Tg may be used alone or in combination. The base rubber may if necessary be blended with a diene rubber other than SBRs specified above, and this diene corubber should be added, though not restricted, in an amount preferably up to 80% by weight of the total weight of the base rubber. Specific examples include natural rubber (NR), polyisoprene rubber (IR), styrene-butadiene rubber (SBR) of higher than $-40°$ C. in Tg, butadiene rubber (BR), butyl rubber (IIR), halobutyl rubber (hal-IIR) and the like.

One important aspect of the invention resides in the use of SBRs of specific temperatures of Tg which have reduced temperature dependency on hardness and thus ensure improved rigidity, tensile strength and abrasion resistance characteristics at a tire running temperature of about $-20°$ to $100°$ C.

Suitable carbon blacks are those having an $N_2SA$ of 110 to 140 $m^2/g$ as determined by nitrogen adsorption, a 24M4 DBP of 85 to 95 ml/100 g as determined by dibutyl phthalate adsorption, a ΔDst of smaller than 55 mμ as determined by aggregate size distribution and a ΔDst to $N_2SA$ ratio of less than 0.43. Those parameters are measured in a manner later described.

Less than 110 $m^2/g$ in $N_2SA$ would fail to raise tan δ to a desirable level at $60°$ C., eventually leading to unacceptable gripping. More than 140 $m^2/g$, given sufficient loss tangent and hence acceptable gripping force, would make the resultant rubber mix objectionably hard at low temperature and thus hazardous to tire running in cold season.

The parameter of 24M4 DBP if below 85 ml/100 g would be responsible for abrasion and if above 95 ml/100 g would result in a rubber mix having poor tensile strength.

The aggregate size distribution, ΔDst, should not exceed 55 mμ as it acts as a primary determinant in attaining acceptable loss tangent at both $0°$ C. and $60°$ C. This physical property is usually taken as probing the distribution of particle sizes and the nature of carbon black powders bonded by melting in aggregated form and therefore is associated closely with the temperature of reaction and the turbulence of combustion gas in the formation of carbon black. Because ΔDst is fairly correlative with $N_2SA$, the more $N_2SA$ the less ΔDst, the smaller the ΔDst-$N_2SA$ ratio is.

The ΔDst-$N_2SA$ ratio if more than 0.43 would not be effective for buildup of tan δ at $0°$ C. and at $60°$ C. even with the use of $N_2SA$ of 110 to 140 $m^2/g$.

The carbon black should be added in an amount of 30 to 100 parts by weight based on 100 parts by weight of the base rubber. This component if smaller than 30 parts would make the final rubber mix susceptible to abrasion and if larger than 100 parts would become difficult to uniformly disperse in the mix.

The rubber composition of the invention should, in addition to the foregoing properties, have a ΔHs of not more than 12, preferably below 10, which donates a difference of hardnesses at −10° C. and at 20° C.

Various other additives may be incorporated which are chosen from vulcanization agents such as sulfur, vulcanization accelerators, vulcanization activators, antioxidants, tackifiers, softeners, fillers and the like.

EXAMPLES

The following examples are given to further illustrate the present invention. In all formulations the numerical figures are indicated in part by weight unless otherwise noted.

Different rubber compositions, inventive and comparative, were prepared as enumerated in Table 3. Used were five types of styrene-butadiene rubber (SBR) as shown in Table 1 and four types of carbon black (CB) as shown in Table 2. The compositions each were vulcanized at 160° C. for 30 minutes. Performance evaluation was made of the vulcanizates for hardness at both −10° C. and at 20° C., ΔHs and tan δ at both 0° C. and 60° C. with the results given in Table 3.

The physicochemical properties of SBRs tested and of CBs tested were measured under the conditions mentioned below.

Nitrogen Adsorption Surface Area (N$_2$SA)(m$^2$)

ASTM D-3037-78, "Standard Method of Testing Carbon Black-Surface Area by Nitrogen Adsorption", Method C, was followed.

24M4 DBP Adsorption (ml/100 g)

Measurement was made as stipulated in ASTM D-3493.

Half Value Width of Aggregate Size Distribution (ΔDst)(mμ)

Centrifugal classification was effected with the use of a disc centrifuge manufactured by Joyce Loebl Co., England. A carbon black sample is accurately weighed and then added with a 20% aqueous ethanol solution and a surfactant, followed by ultrasonic dispersion to provide a dispersion concentrated to 5 mg/100 cc. The dispersion was centrifuged at 8,000 rpm. Into the centrifuge were put 10 ml of a spin liquid in distilled water, subsequently 0.5 ml of 20% aqueous ethanol as a buffer and finally 0.5 to 1.0 ml of the dispersion through a syringe. Thereafter, centrifugation was initiated and a photoelectric recorder switched on to draw a distribution curve of the aggregate converted by Stock's mode of diameter. ΔDst is determined from the half value width of the maximum absorbance on the histogram.

Hardness (Hs) and ΔHs

JIS K-6301 was followed. The greater numerical figure the harder. ΔHs was taken as a difference of Hs at −10° C. and at 20° C.

Gripping Force (tan δ)

Viscoelastic spectrometer manufactured by Iwamoto Seisakusho Co., Ltd. Japan, was used at 0° C. and 60° C., at 10±2% strain and at 20 Hz. The higher tan δ the more intense gripping.

Glass Transition Temperature (Tg)

JIS K-6301 was followed in determining this property.

As appears clear from Table 3, Examples 1 and 2 and Comparative Example 1 have the same recipes except for the use of different CBs. The three rubber mixes show the same level of Hs at both temperatures. Inventive CB-1 and CB-2 excel, in contrast to comparative CB-N220, in tan δ at 0° C. and at 60° C., meaning that they can produce superior road gripping in wet and dry weathers. CB-N110 outside the scope of the invention is insufficient in tan δ and excessive in Hs as is evident from Comparative Example 2.

In Examples 3 to 5 and Comparative Examples 3 to 5 the nature and amount of SBRs and the type and amount of CBs have been varied and compared in pair. The inventive mixes are highly satisfactory in respect of all test qualities.

Too high Tg, SBR-2 of −21° C., has been found inadequately runnable in cold season, as seen from Comparative Example 7, because of too high Hs at −10° C. and hence unacceptable ΔHs.

Different four tires were produced with the application of the compositions of Examples 1 and 5 and of Comparative Examples 1 and 5. Running stability on dry and snowy roads and braking ability on a wet road were examined under the conditions given below and with the results shown in Table 4.

Running Stability

A feeling test was done and adjudged with each of comparative tires A and C set at an index of 100. The larger index the more stable runnability.

Wet Braking

Running was performed on a wet road covered with water to a depth of 1 to 3 mm. Grading was made as in the stability test.

Inventive tire B is comparable in snowy running to, but superior in wet braking to comparative tire A. Improved braking are attributed to the effect of CB-1 as opposed to CB-N220. By comparison of CB-1 to CB-N110, inventive tire D has been proved acceptably runnable in all weathers.

The invention has been described in conjunction with certain specific embodiments. It will be noted however that various modifications and alternations may be made as conceived by those versed in the art within the scope of the appended claims.

TABLE 1

| rubber | polymerization | styrene content (%) | vinyl content (%) | Tg (°C.) |
| --- | --- | --- | --- | --- |
| SBR-1712[1)] | emulsion | 23.5 | 13 | −51 |
| SBR-1534[2)] | solution | 18 | 10 | −72 |
| SBR-1 | solution | 19 | 37 | −49 |
| SBR-1502[3)] | emulsion | 23.5 | 13 | −51 |
| SBR-2 | emulsion | 45 | 13 | −21 |

TABLE 2

| carbon black | N$_2$SA | 24M4 DBP | ΔDst | ΔDst/N$_2$SA |
| --- | --- | --- | --- | --- |
| CB-N220[4)] | 110 | 96 | 70 | 0.636 |
| CB-N110[5)] | 193 | 99 | 76 | 0.531 |
| CB-1 | 123 | 90 | 49 | 0.398 |
| CB-2 | 135 | 93 | 53 | 0.393 |

TABLE 3

| recipe/property | CE-1 | CE-2 | E-1 | E-2 | CE-3 | E-3 | CE-4 | E-4 | CE-5 | E-5 | CE-6 | E-6 | CE-7 |
|---|---|---|---|---|---|---|---|---|---|---|---|---|---|
| NR (SMR-20) | — | — | — | — | — | — | — | — | — | — | 30 | 30 | — |
| SBR-1712 | 137.5 | 137.5 | 137.5 | 137.5 | 68.75 | 68.75 | 96.25 | 96.25 | 68.75 | 68.75 | — | — | — |
| SBR-1534 | — | — | — | — | 68.75 | 68.75 | — | — | — | — | — | — | — |
| SBR-1 | — | — | — | — | — | — | — | — | 68.75 | 68.75 | — | — | — |
| SBR-1502 | — | — | — | — | — | — | — | — | — | — | 70 | 70 | — |
| SBR-2 | — | — | — | — | — | — | — | — | — | — | — | — | 137.5 |
| BR-1441[6] | — | — | — | — | — | — | 41.25 | 41.25 | — | — | — | — | — |
| CB-N220 | 68.75 | — | — | — | 68.75 | — | 68.75 | — | — | — | 45 | — | — |
| CB-N110 | — | 68.75 | — | — | — | — | — | — | 75 | — | — | — | — |
| CB-1 | — | — | 68.75 | — | — | 68.75 | — | 68.75 | — | 75 | — | 45 | 90 |
| CB-2 | — | — | — | 68.75 | — | — | — | — | — | — | — | — | — |
| zinc oxide[7] | 3 | 3 | 3 | 3 | 3 | 3 | 3 | 3 | 3 | 3 | 3 | 3 | 3 |
| stearic acid[8] | 2 | 2 | 2 | 2 | 2 | 2 | 2 | 2 | 2 | 2 | 2 | 2 | 2 |
| antioxidant[9] | 3 | 3 | 3 | 3 | 3 | 3 | 3 | 3 | 3 | 3 | 3 | 3 | 3 |
| wax | 0.5 | 0.5 | 0.5 | 0.5 | 0.5 | 0.5 | 0.5 | 0.5 | 0.5 | 0.5 | 0.5 | 0.5 | 0.5 |
| aromatic oil[10] | — | — | — | — | — | — | — | — | — | — | 5 | 5 | 17.5 |
| accelerator[11] | 1.38 | 1.38 | 1.38 | 1.38 | 1.38 | 1.38 | 1.38 | 1.38 | 1.38 | 1.38 | 1.38 | 1.38 | 1.38 |
| sulfur[12] | 1.75 | 1.75 | 1.75 | 1.75 | 1.75 | 1.75 | 1.75 | 1.75 | 1.75 | 1.75 | 1.75 | 1.75 | 1.75 |
| Hs | | | | | | | | | | | | | |
| −10° C. | 70 | 76 | 70 | 70 | 67 | 67 | 66 | 66 | 79 | 73 | 66 | 66 | 95 |
| +20° C. | 60 | 62 | 60 | 60 | 59 | 59 | 58 | 58 | 65 | 63 | 58 | 58 | 72 |
| ΔHs | 10 | 14 | 10 | 10 | 8 | 8 | 8 | 8 | 14 | 10 | 8 | 8 | 21 |
| tan δ, 0° C. | 0.62 | 0.60 | 0.64 | 0.64 | 0.45 | 0.47 | 0.43 | 0.44 | 0.70 | 0.75 | 0.41 | 0.43 | 1.258 |
| tan δ, 60° C. | 0.35 | 0.37 | 0.42 | 0.43 | 0.30 | 0.35 | 0.27 | 0.30 | 0.41 | 0.46 | 0.20 | 0.23 | 0.554 |

E: Example
CE: Comparative Example

TABLE 4

| tire | A | B | C | D |
|---|---|---|---|---|
| tread rubber | CE-1 | E-1 | CE-5 | E-5 |
| dry running | 100 | 107 | 100 | 102 |
| wet braking | 100 | 102 | 100 | 105 |
| snowy running | 100 | 100 | 100 | 107 |

NOTES TO TABLES 1 to 3

1) Nipol 1712, Nippon Zeon Co.
2) Toughden 1534, Asahi Kasei Co.
3) Nipol 1502, Nippon Zeon Co.
4) Show Black 1, Showa Cabot Co.
5) Dia Black A, Mitsubishi Kasei Co.
6) Nipol BR-1441, Nippon Zeon Co.
7) Zinc Flower No. 3, Seido Kagaku Co.
8) Lunac YA, stearic acid for industrial use, Kao Corp.
9) Nocrac 6C, N-(1,3-dimethylbutyl)-N'-phenyl-p-phenylenediamine, Ohuchi Shinko Kagaku Co.
10) Kyoseki Process X-140, Kyodo Sekiyu Co.
11) Nocceler CZ, N-cyclohexylbenzothiazolylsulfenamide, Ohuchi Shinko Kagaku Co.
12) oil-treated sulfur

What is claimed as new and intended to be secured by Letters Patent is:

1. A rubber composition for use as tread portions in automobile tires, which comprises:
   (a) a base rubber comprising at least one styrene-butadiene rubber having a glass transition temperature of lower than −40° C.; and
   (b) a carbon black in an amount of from 30 to 100 parts by weight per 100 parts by weight of said base rubber, said carbon black having an $N_2SA$ of form 110 to 140 $m^2/g$ as determined by nitrogen adsorption, a 24M4 DBP of from 85 to 95 ml/100 g as determined by dibutyl phthalate adsorption, a ΔDst of smaller than 55 mμ as determined by aggregate size distribution, a {Dst to $N_2Sa$ ratio of less than 0.43 and a ΔHs not exceeding 12 as determined by hardness difference at two varying temperatures.

2. The composition of claim 1 wherein said base rubber includes a diene rubber other than said styrene-butadiene rubber.

3. The composition of claim 2 wherein said diene rubber comprises natural rubber, polyisoprene rubber, styrene-butadiene rubber of higher than −40° C. in glass transition temperature, butadiene rubber, butyl rubber and halobutyl rubber.

4. The composition of claim 2 wherein said diene rubber is present in an amount up to 80 percent by weight of the total weight said styrene-butadiene rubber.

* * * * *

UNITED STATES PATENT AND TRADEMARK OFFICE
CERTIFICATE OF CORRECTION

PATENT NO. : 5,206,283
DATED : April 27, 1993
INVENTOR(S) : Kinya Kawakami, Takao Muraki and Shigeru Shinoda It is certified that error appears in the above-identified patent and that said Letters Patent is hereby corrected as shown below:

Claim 1, column 6, line 33, change "form" to --from--;

column 6, line 30, change "{Dst" to --$\Delta$ Dst--;

Signed and Sealed this

Eighth Day of February, 1994

Attest:

BRUCE LEHMAN

Attesting Officer

Commissioner of Patents and Trademarks